US011156852B2

(12) United States Patent
Cheng et al.

(10) Patent No.: US 11,156,852 B2
(45) Date of Patent: Oct. 26, 2021

(54) HOLOGRAPHIC PROJECTION DEVICE, METHOD, APPARATUS, AND COMPUTER READABLE STORAGE MEDIUM

(71) Applicant: BEIJING XIAOMI MOBILE SOFTWARE CO., LTD., Beijing (CN)

(72) Inventors: Liang Cheng, Beijing (CN); Yongfeng Xia, Beijing (CN); Jiaping Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 219 days.

(21) Appl. No.: 16/260,842

(22) Filed: Jan. 29, 2019

(65) Prior Publication Data

US 2019/0235262 A1 Aug. 1, 2019

(30) Foreign Application Priority Data

Jan. 30, 2018 (CN) .......................... 201810091918.X (51) Int. Cl.
*G03H 1/02* (2006.01)
*G02B 30/50* (2020.01)
(Continued)

(52) U.S. Cl.
CPC ............. *G02B 30/50* (2020.01); *G02B 13/18* (2013.01); *G03H 1/02* (2013.01); *G03H 1/08* (2013.01);
(Continued)

(58) Field of Classification Search
CPC .... G02B 30/50; G02B 13/18; G02B 27/0172; H04N 13/395; G03H 1/02; G03H 1/08;
(Continued)

(56) References Cited

U.S. PATENT DOCUMENTS 4,829,365 A * 5/1989 Eichenlaub ............ G02B 30/27
348/54
7,636,610 B2 * 12/2009 Schillen ................ B29C 64/129
700/119
(Continued)

FOREIGN PATENT DOCUMENTS

CN 103324023 A 9/2013
WO WO 2013/018767 A1 2/2013

OTHER PUBLICATIONS

Extended European Search Report dated May 31, 2019, in Patent Application No. 19154025.1, 10 pages.
(Continued)

*Primary Examiner* — Jennifer D. Carruth
(74) *Attorney, Agent, or Firm* — Oblon, McClelland, Maier & Neustadt, L.L.P.

(57) ABSTRACT

The present disclosure relates to a holographic projection device, a holographic projection method, and a holographic projection apparatus. The holographic projection device includes a first stereoscopic imaging device including a plurality of transparent pixel blocks; and a light emitting device including a plurality of light emitting units, wherein the plurality of transparent pixel blocks have a one-to-one correspondence with the plurality of light emitting units, and wherein for a light emitting unit A of the plurality of light emitting units, the light emitting unit A is configured to illuminate a transparent pixel block A, and the transparent pixel block A is a transparent pixel block corresponding to the light emitting unit A in the plurality of transparent pixel blocks.

20 Claims, 9 Drawing Sheets

(51) Int. Cl.
*H04N 13/395* (2018.01)
*G02B 13/18* (2006.01)
*G03H 1/08* (2006.01)

(52) U.S. Cl.
CPC ....... *H04N 13/395* (2018.05); *G03H 2210/30* (2013.01)

(58) Field of Classification Search
CPC ............. G03H 2210/30; G03H 1/2202; G03H 1/0808; G03H 1/2294; G03H 2001/0224; G06T 7/85; G06T 15/06; G06T 15/20; G06T 19/20; G06T 19/006
See application file for complete search history.

(56) References Cited

U.S. PATENT DOCUMENTS

| | | | | |
|---|---|---|---|---|
| 9,335,548 | B1* | 5/2016 | Cakmakci | G06F 3/017 |
| 9,838,671 | B2* | 12/2017 | de la Barre | H04N 13/30 |
| 9,866,822 | B1 | 1/2018 | Mitchell | |
| 10,649,128 | B2* | 5/2020 | Fattal | G02B 6/0036 |
| 10,663,657 | B2* | 5/2020 | Karafin | G03H 1/2202 |
| 10,701,326 | B1* | 6/2020 | Osmanis | G02B 5/0284 |
| 10,778,962 | B2* | 9/2020 | Ng | G09F 9/3026 |
| 2003/0067539 | A1* | 4/2003 | Doerfel | G02B 30/00 348/51 |
| 2010/0027083 | A1* | 2/2010 | Kroll | G03H 1/02 359/9 |
| 2010/0253995 | A1* | 10/2010 | Reichelt | G02B 26/0808 359/290 |
| 2011/0122467 | A1* | 5/2011 | Futterer | G02F 1/133524 359/9 |
| 2012/0147134 | A1* | 6/2012 | Shin | G03H 1/2205 348/40 |
| 2012/0274834 | A1* | 11/2012 | Gidon | H01L 27/14623 348/345 |
| 2013/0077154 | A1* | 3/2013 | Popovich | G02F 1/133512 359/316 |
| 2014/0300711 | A1* | 10/2014 | Kroon | H04N 13/144 348/51 |
| 2015/0279321 | A1* | 10/2015 | Falconer | G09G 5/10 345/589 |
| 2018/0321499 | A1* | 11/2018 | Tan | G02B 26/0808 |
| 2019/0064734 | A1* | 2/2019 | McCoy | G03H 1/0005 |
| 2019/0252453 | A1* | 8/2019 | Hanelt | H04N 5/345 |
| 2019/0306437 | A1* | 10/2019 | Morales Delgado | G03H 1/0465 |
| 2020/0192281 | A1* | 6/2020 | Kim | G03H 1/0402 |
| 2020/0209806 | A1* | 7/2020 | Burnett, III | G02B 3/0056 |
| 2020/0228782 | A1* | 7/2020 | Fattal | H04N 13/282 |
| 2020/0296327 | A1* | 9/2020 | Karafin | H04N 7/142 |
| 2020/0301165 | A1* | 9/2020 | Fattal | G02B 27/42 |
| 2020/0319320 | A1* | 10/2020 | Kubacki | G01S 7/4813 |

OTHER PUBLICATIONS

Combined Chinese Office Action and Search Report dated Feb. 10, 2021 in Chinese Patent Application No. 201810091918.X (with English translation), 15 pages.

* cited by examiner

HOLOGRAPHIC PROJECTION DEVICE, METHOD, APPARATUS, AND COMPUTER READABLE STORAGE MEDIUM

CROSS-REFERENCE TO RELATED APPLICATIONS

This application is based on and claims priority to Chinese Patent Application No. 201810091918.X, filed on Jan. 30, 2018, the entire contents of which are incorporated herein by reference.

TECHNICAL FIELD

The present disclosure relates to the field of virtual imaging technologies, and more particularly, to a holographic projection device, a holographic projection method, a holographic projection apparatus, and a computer readable storage medium.

BACKGROUND

With the continuous development of virtual imaging technology, holographic projection technology has emerged. Holographic projection technology refers to technology that records and reproduces true three-dimensional 3D images of objects by using principles of interference and diffraction. Holographic projection technology can produce stereoscopic aerial illusions, and can allow the illusions to interact with performers to complete performances, thus resulting in stunning performance effects.

Holographic projection of objects may be achieved by a holographic projection film. The holographic projection film is a transparent curtain, after the image of an object is projected on the holographic projection film, users can see the scene around the image of the object through the holographic projection film while maintaining the clear image, such that the image of the object is integrated with the environment to achieve a holographic projection effect.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a holographic projection device. The holographic projection device includes a first stereoscopic imaging device including a plurality of transparent pixel blocks; and a light emitting device including a plurality of light emitting units, wherein the plurality of transparent pixel blocks have a one-to-one correspondence with the plurality of light emitting units, and wherein for a light emitting unit A of the plurality of light emitting units, the light emitting unit A is configured to illuminate a transparent pixel block A, and the transparent pixel block A is a transparent pixel block corresponding to the light emitting unit A in the plurality of transparent pixel blocks.

According to an aspect, a target area in the transparent pixel block A is reflective, an area in the transparent pixel block A other than the target area is not reflective, and there is no target area in a transparent pixel block other than the transparent pixel block A between the target area in the transparent pixel block A and the light emitting unit A, and the light emitting unit A is configured to emit light to the target area in the transparent pixel block A.

In an example, light emitted by each light emitting unit of the plurality of light emitting units includes a laser.

According to an aspect, the first stereoscopic imaging device includes a plurality of transparent pixel layers, and each transparent pixel layer of the plurality of transparent pixel layers is provided with at least one transparent pixel block of the plurality of transparent pixel blocks.

In an example, the first stereoscopic imaging device includes a plurality of second stereoscopic imaging devices, and the plurality of second stereoscopic imaging devices are arranged in a plurality of rows and columns, each second stereoscopic imaging device of the plurality of second stereoscopic imaging devices includes at least one transparent pixel block of the plurality of transparent pixel blocks, the at least one transparent pixel block being arranged vertically.

In another example, the first stereoscopic imaging device has a columnar shape, and the light emitting device is arranged at a bottom of the first stereoscopic imaging device.

Aspects of the disclosure also provide a holographic projection method. The holographic projection method includes obtaining an image of an object to be projected; determining a plurality of target pixel blocks required for projection from a plurality of transparent pixel blocks based on the image of the object, and determining pixel values corresponding respectively to the plurality of target pixel blocks; determining a plurality of target emitting units having a one-to-one correspondence with the plurality of target pixel blocks from a plurality of light emitting units; illuminating the corresponding target pixel block through each target emitting unit of the plurality of target emitting units based on the pixel values corresponding respectively to the plurality of target pixel blocks; and generating a holographic projection of the object based on the illuminated corresponding target pixel block.

According to an aspect, when determining the plurality of target pixel blocks required for projection from the plurality of transparent pixel blocks based on the image of the object and determining the pixel values corresponding respectively to the plurality of target pixel blocks, the method further includes determining a plurality of projection positions of the object based on the image of the object, and determining pixel values corresponding respectively to the plurality of projection positions; and determining transparent pixel blocks located at the plurality of projection positions in the plurality of transparent pixel blocks as the plurality of target pixel blocks, and determining the pixel values corresponding respectively to the plurality of projection positions as the pixel values corresponding respectively to the plurality of target pixel blocks.

According to another aspect, when determining the plurality of projection positions of the object based on the image of the object, and determining the pixel values corresponding respectively to the plurality of projection positions, the method further includes, when the image of the object includes a three-dimensional image, for a pixel point A of a plurality of pixel points in the three-dimensional image, determining a position where the pixel point A is located as a projection position A, and determining a pixel value of the pixel point A as a pixel value corresponding to the projection position A; and when the image of the object includes a plurality of two-dimensional images, constructing a three-dimensional image of the object based on the plurality of two-dimensional images, determining a position where a pixel point A in the three-dimensional image is located as a projection position A, and determining a pixel value of the pixel point A as a pixel value corresponding to the projection position A.

According to yet another aspect, when determining the plurality of target emitting units having the one-to-one correspondence with the plurality of target pixel blocks from the plurality of light emitting units, the method further includes selecting a target pixel block from the plurality of target pixel blocks; obtaining a pixel block identifier of the selected target pixel block, and obtaining a corresponding light emitting unit identifier from a correspondence between pixel block identifiers and light emitting unit identifiers based on the pixel block identifier of the selected target pixel block; and determining a light emitting unit identified by the corresponding light emitting unit identifier as the target emitting unit corresponding to the selected target pixel block.

According to yet another aspect, the method further includes establishing the correspondence between the pixel block identifiers and the light emitting unit identifiers, wherein, when establishing the correspondence between the pixel block identifiers and the light emitting unit identifiers, the method further includes detecting a setting instruction; obtaining a pixel block identifier and a light emitting unit identifier carried in the setting instruction; and storing the pixel block identifier and the light emitting unit identifier in an association manner to form the correspondence between the pixel block identifiers and the light emitting unit identifiers.

In an example, the setting instruction is triggered by at least one of a click operation, a slide operation, and a voice operation.

According to an aspect, when illuminating the corresponding target pixel block through each target emitting unit of the plurality of target emitting units based on the pixel values corresponding respectively to the plurality of target pixel blocks, the method further includes, for a target emitting unit A of the plurality of target emitting units, illuminating a target pixel block A through light having a pixel value X of the target pixel block A emitted by the target emitting unit A.

Aspects of the disclosure also provide a holographic projection apparatus including a processor and a memory configured to store instructions executable by the processor. The processor is configured to obtain an image of an object to be projected; determine a plurality of target pixel blocks required for projection from a plurality of transparent pixel blocks based on the image of the object, and determine pixel values corresponding respectively to the plurality of target pixel blocks; determine a plurality of target emitting units having a one-to-one correspondence with the plurality of target pixel blocks from a plurality of light emitting units; illuminate the corresponding target pixel block through each target emitting unit of the plurality of target emitting units based on the pixel values corresponding respectively to the plurality of target pixel blocks; and generate a holographic projection of the object based on the illuminated corresponding target pixel block.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

It is to be understood that both the foregoing general description and the following detailed description are illustrative and explanatory only and are not restrictive of the present disclosure.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

For convenience of understanding, before descriptions of aspects of the present disclosure are explained, application scenarios involved in aspects of the present disclosure are introduced first.

With the continuous development of virtual imaging technology, holographic projection technology has emerged. Holographic projection technology can produce stereoscopic aerial illusions, and can allow the illusions to interact with performers to complete performances, thus resulting in stunning performance effects. At present, holographic projection of objects is usually achieved by a holographic projection film. The holographic projection film is a transparent curtain, after the image of an object is projected on the holographic projection film, users can see the scene around the image of the object through the holographic projection film while maintaining the clear image, such that the image of the object is integrated with the environment, to achieve holographic projection effect. However, the image projected on the holographic projection film is a planar 2d (two-dimensional) image, and the image seen from different angles is the same, holographic projection effect is poor. Thus, the present disclosure provides a holographic projection device to improve the holographic projection effect.

In the following, the holographic projection device provided in aspects of the present disclosure will be described in detail below with reference to the accompanying drawings.

Figure 1A:
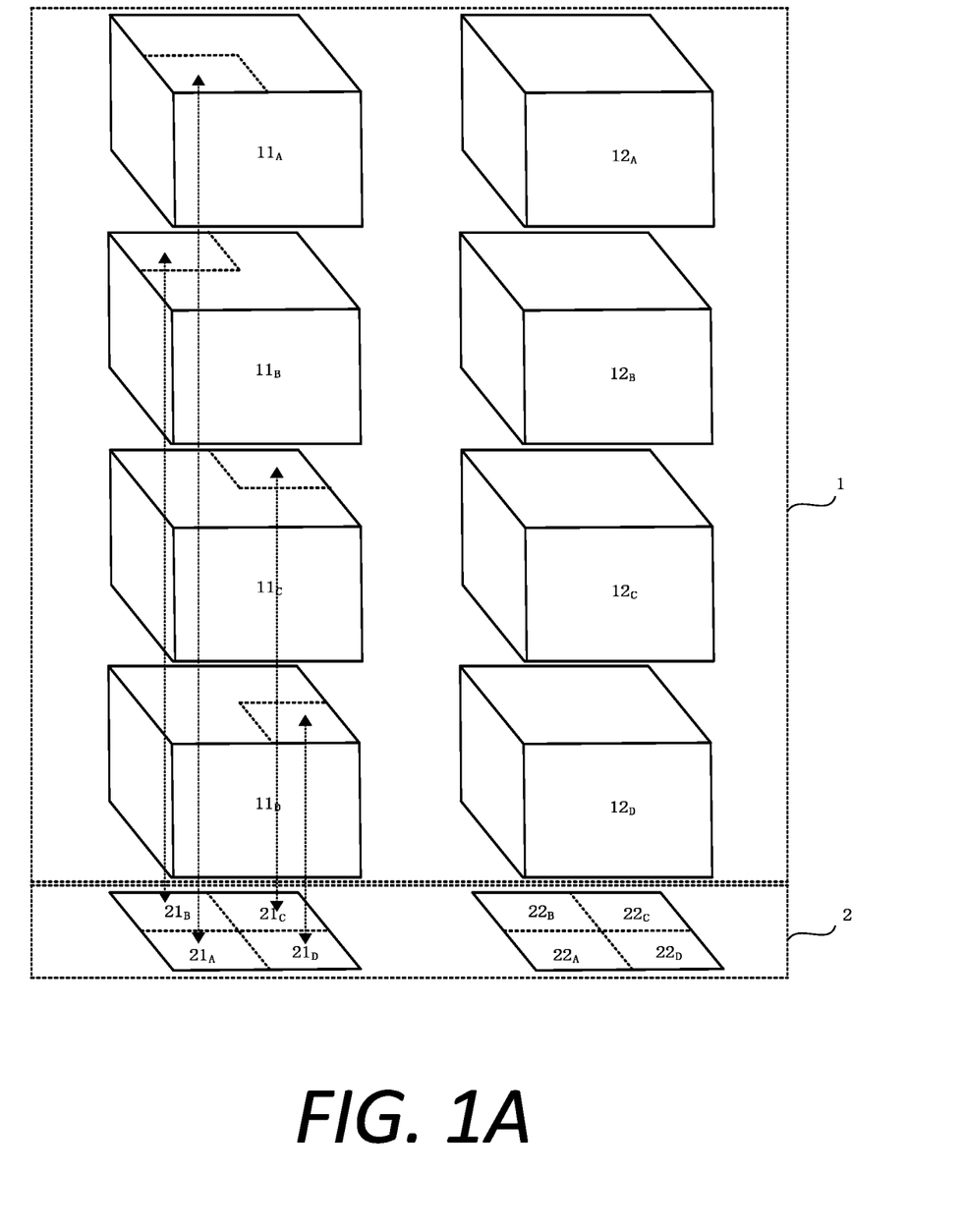
FIG. 1A is a schematic diagram illustrating a holographic projection device according to a first exemplary aspect of the present disclosure.

FIG. 1A is a schematic diagram illustrating a holographic projection device according to an exemplary aspect. As shown in FIG. 1A, the device includes a first stereoscopic imaging device 1 and a light emitting device 2.

The first stereoscopic imaging device 1 includes a plurality of transparent pixel blocks 11 (such as the pixel block $11_A$, $11_B$, $11_C$, $11_D$ or $12_A$, $12_B$, $12_C$, $12_D$ as shown in FIG. 1A to FIG. 1E), the light emitting device 2 includes a plurality of light emitting units 21 (such as the pixel block $21_A$, $21_B$, $21_C$, $21_D$ or $22_A$, $22_B$, $22_C$, $22_D$ as shown in FIG. 1A to FIG. 1E), and the plurality of transparent pixel blocks 11 have a one-to-one correspondence with the plurality of light emitting units 21. In other words, each of light emitting units 21 have a one-to-one correspondence with a target area 111 of each transparent pixel block 11. The target area 111 of transparent pixel block 11 is shown in figures, such as $111_A$, $111_B$, $111_C$, $111_D$.

For a light emitting unit $21_A$ of the plurality of light emitting units 21, the light emitting unit $21_A$ is configured to illuminate a transparent pixel block $11_A$, and the transparent pixel block $11_A$ is a transparent pixel block corresponding to the light emitting unit $21_A$ in the plurality of transparent pixel blocks 11.

It should be noted that, the first stereoscopic imaging device 1 is configured to display a holographic projection image of an object, the light emitting device 2 is configured to illuminate the plurality of transparent pixel blocks 11 included in the first stereoscopic imaging device 1, to form the holographic projection image of the object in the first stereoscopic imaging device 1.

In addition, any one of the plurality of transparent pixel blocks 11 may be made of a transparent material. For example, any one of the plurality of transparent pixel blocks 11 may be made of a transparent material such as glass or transparent plastic. The plurality of transparent pixel blocks 11 can be regarded as a plurality of pixel points, and the first stereoscopic imaging device 1 can accurately display a stereoscopic image of the object through the plurality of transparent pixel blocks 11.

Furthermore, any one of the plurality of light emitting units 21 can be configured to emit light. For example, any one of the plurality of light emitting units 21 may be a LED (Light-Emitting Diode), or the like.

It should be noted that, when holographic projection is implemented by the holographic projection device, since the target areas of the plurality of transparent pixel blocks 11 have the one-to-one correspondence with the plurality of light emitting units 21, the light emitting device 2 can illuminate the plurality of transparent pixel blocks 11 included in the first stereoscopic imaging device 1 through the plurality of light emitting units 21 included therein. In other words, any 3D point in the first stereoscopic imaging device 1 can be illuminated by the light emitting device 2, such that the holographic projection device can accurately achieve 3D projection of the object, and the holographic projection effect is improved.

Figure 1B:
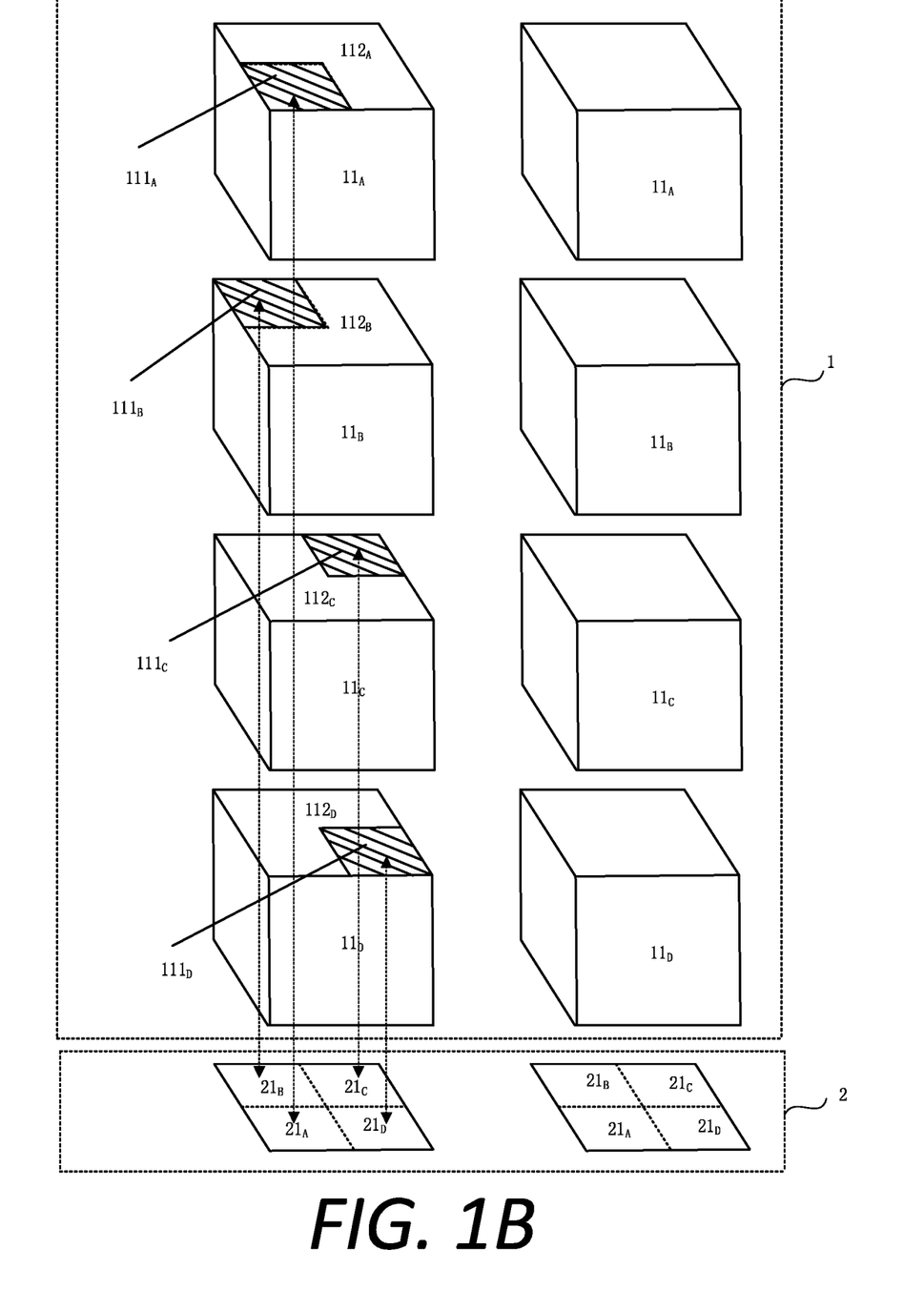
FIG. 1B is a schematic diagram illustrating a holographic projection device according to a second exemplary aspect of the present disclosure.

Referring to FIG. 1B, the target area $111_A$ in the transparent pixel block $11_A$ is reflective, an area $112_A$ (i.e., non-target area) in the transparent pixel block $11_A$ other than the target area $111_A$ is not reflective, and there is no target area $111_B$ in a transparent pixel block $11_B$ other than the transparent pixel block $11_A$ between the target area $111_A$ in the transparent pixel block $11_A$ and the light emitting unit $21_A$. The light emitting unit $21_A$ is configured to emit light to the target area $111_A$ in the transparent pixel block $11_A$.

It should be noted that, the target area $111_A$ in the transparent pixel block $11_A$ may be made of a transparent reflective material. For example, the target area $111_A$ in the transparent pixel block $11_A$ may be made of a transparent reflective material such as a reflective film, a reflective paper, or a reflective strip, etc.

In addition, the non-target area $112_A$ in the transparent pixel block $11_A$ other than the target area $111_A$ may be made of a transparent non-reflective material. For example, the area $112_A$ in the transparent pixel block $11_A$ other than the target area $111_A$ may be made of a transparent non-reflective material such as transparent glass, or transparent plastic, etc. The non-target area $112_B$ in the transparent pixel block $11_B$, the non-target area $112_C$ in the transparent pixel block $11_C$ and the non-target area $112_D$ in the transparent pixel block $11_D$ shown in FIG. 1B may also be made of a transparent non-reflective material.

It should be noted that, since the target area $111_A$ in the transparent pixel block $11_A$ can be reflective, when there is light striking the target area $111_A$ in the transparent pixel block $11_A$, the target area $111_A$ in the transparent pixel block $11_A$ can reflect the light into people's eyes. i.e., in this case, the target area $111_A$ in the transparent pixel block $11_A$ is illuminated.

When the light emitting unit $21_A$ emits light to the target area $111_A$ in the transparent pixel block $11_A$, since there is no target area $111_B$ in the transparent pixel block $11_B$ other than the transparent pixel block $11_A$ between the target area $111_A$ in the transparent pixel block $11_A$ and the light emitting unit $21_A$, the light emitted by the light emitting unit $21_A$ will not be reflected by the target area $111_E$ in the transparent pixel block $11_B$. In other words, the light emitted by the light emitting unit $21_A$ can directly strike the target area $111_A$ in the transparent pixel block $11_A$, such that the target area $111_A$ in the transparent pixel block $11_A$ can be illuminated, i.e., the transparent pixel block $11_A$ can be illuminated.

In at least one aspect, the light emitted by each light emitting unit 21 in the plurality of light emitting units 21 may include a laser.

It should be noted that, since the laser can directionally emit light, divergence of light beam is small, brightness of the laser is high, and energy density of the laser is large, when the light emitted by each light emitting units 21 in the plurality of light emitting units 21 is the laser, the emitted laser will not diverge to other directions, such that the light emitted by the light emitting unit $21_A$ will only strike the target area $111_A$ in the transparent pixel block $11_A$, and will not strike the target area $111_B$ in the transparent pixel block $11_B$ other than the transparent pixel block $11_A$. In this case, the light emitted by the light emitting unit $21_A$ will accurately illuminate the transparent pixel block $11_A$, and will not illuminate the transparent pixel block $11_B$ other than the transparent pixel block $11_A$, such that accuracy of holographic projection of the holographic projection device can be guaranteed.

Figure 1C:
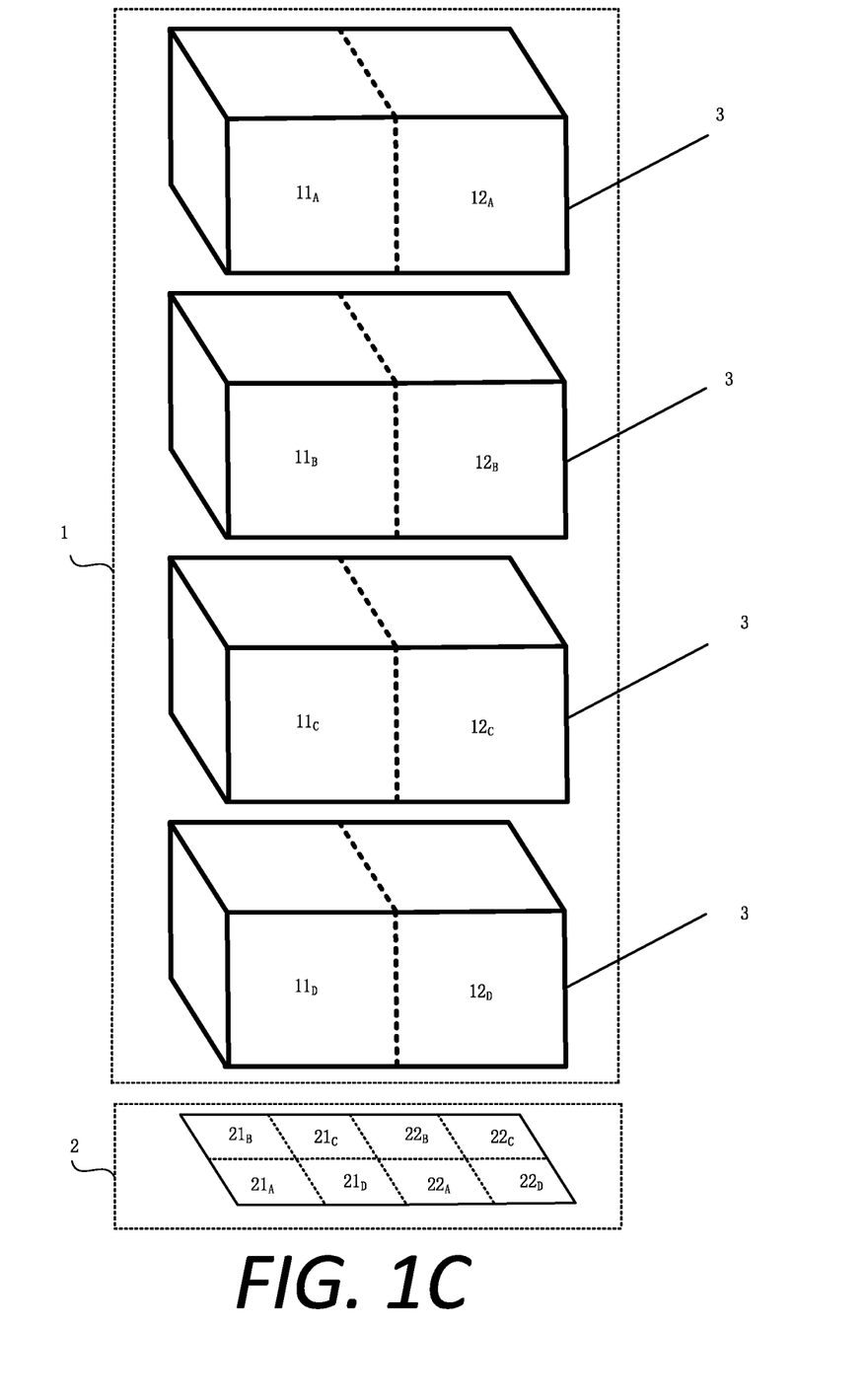
FIG. 1C is a schematic diagram illustrating a holographic projection device according to a third exemplary aspect of the present disclosure.

Referring to FIG. 1C, the first stereoscopic imaging device 1 includes a plurality of transparent pixel layers 3, and each transparent pixel layer 3 of the plurality of transparent pixel layers 3 is provided with at least one transparent pixel block 11 of the plurality of transparent pixel blocks 11.

It should be noted that, when the first stereoscopic imaging device 1 includes a plurality of transparent pixel layers 3, the light emitting device 2 may include a plurality of first light emitting modules, and each first light emitting module of the plurality of first light emitting modules is provided with at least one light emitting unit 21 of the plurality of light emitting units 21. The plurality of first light emitting modules may have a one-to-one correspondence with the plurality of transparent pixel layers 3. In other words, for a first light emitting module of the plurality of first light emitting modules, the first light emitting module is configured to illuminate its corresponding transparent pixel layer 3. In this case, the at least one light emitting unit 21 in the first light emitting module has a one-to-one correspondence with the target area of at least one transparent pixel block 11 in the transparent pixel layer 3.

For example, the first stereoscopic imaging device 1 includes 9 transparent pixel layers 3, and each transparent pixel layer 3 of the 9 transparent pixel layers 3 is provided with 81 transparent pixel blocks 11. In this case, the light emitting device 2 may include 9 first light emitting modules, and each first light emitting module of the 9 first light emitting modules may be provided with 81 light emitting units 21, such that the 9 first light emitting modules can illuminate the 9 transparent pixel layers 3 one by one.

It should be noted that, the first stereoscopic imaging device 1 includes a plurality of transparent pixel layers 3, and the plurality of transparent pixel blocks 11 in the first stereoscopic imaging device 1 are arranged in the plurality of transparent pixel layers 3. Therefore, during movement of the first stereoscopic imaging device 1, at least one transparent pixel block 11 in the transparent pixel layer 3 can be moved integrally without being scattered, thereby facilitating use of the first stereoscopic imaging device 1.

Figure 1D:
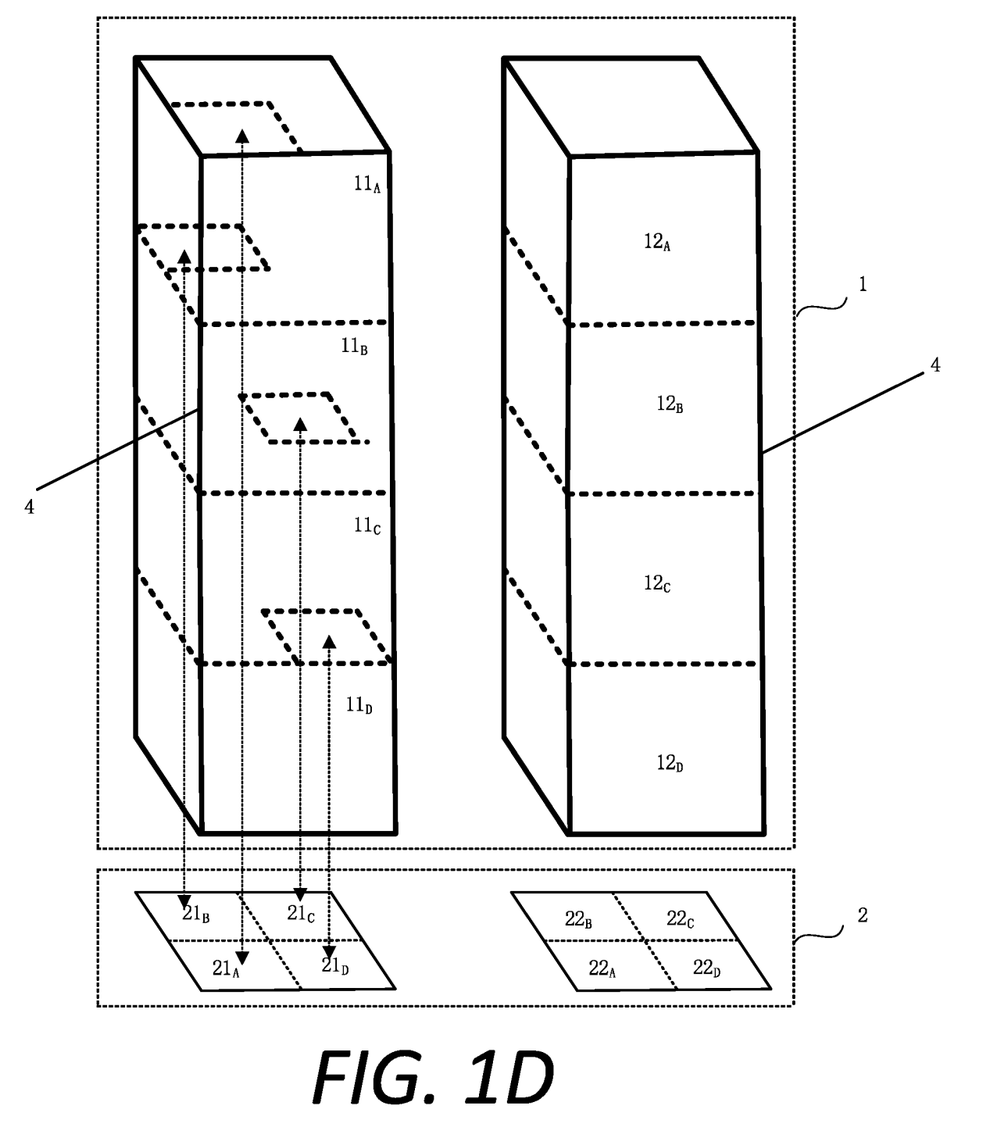
FIG. 1D is a schematic diagram illustrating a holographic projection device according to a fourth exemplary aspect of the present disclosure.

Referring to FIG. 1D, the first stereoscopic imaging device 1 includes a plurality of second stereoscopic imaging devices 4, and the plurality of second stereoscopic imaging devices 4 are arranged in a plurality of rows and columns. Each second stereoscopic imaging device 4 of the plurality of second stereoscopic imaging devices 4 includes at least one transparent pixel block 11 of the plurality of transparent pixel blocks 11, and the at least one transparent pixel block 11 are arranged vertically.

It should be noted that, when the first stereoscopic imaging device 1 includes a plurality of second stereoscopic imaging devices 4, the light emitting device 2 may include a plurality of second light emitting modules, and each second light emitting module of the plurality of second light emitting modules is provided with at least one light emitting unit 21 of the plurality of light emitting units 21. The plurality of second light emitting modules may have a one-to-one correspondence with the plurality of second stereoscopic imaging devices 4. In other words, for a second light emitting module of the plurality of second light emitting modules, the second light emitting module is configured to illuminate its corresponding second stereoscopic imaging device 4. In this case, the at least one light emitting unit 21 in the second light emitting module have a one-to-one correspondence with the at least one transparent pixel block 11 in the second stereoscopic imaging device 4.

For example, the first stereoscopic imaging device 1 includes 81 second stereoscopic imaging devices 4, the 81 second stereoscopic imaging devices 4 are arranged in 9 rows and 9 columns, and each second stereoscopic imaging device 4 includes 9 transparent pixel blocks 11 arranged vertically. In this case, the light emitting device 2 may include 81 second light emitting modules, and each second light emitting module of the 81 second light emitting modules may be provided with 9 light emitting units 21, such that the 81 second light emitting modules can illuminate the 81 second stereoscopic imaging devices 4 one by one.

Referring to FIG. 1A, the first stereoscopic imaging device 1 may have a columnar shape, and the light emitting device 2 is arranged at the bottom of the first stereoscopic imaging device 1.

It should be noted that, the light emitting device 2 may be flexibly arranged at the bottom of the first stereoscopic imaging device 1. In this case, before the holographic projection device is used, the plurality of light emitting units 21 included in the light emitting device 2 may be arranged in a one-to-one correspondence with the plurality of transparent pixel blocks 11 included in the first stereoscopic imaging device 1, and then each transparent pixel block 11 can be illuminated by its corresponding light emitting unit 21. Thus, the light emitting device 2 can be moved independently of the first stereoscopic imaging device 1, and when the light emitting device 2 or the first stereoscopic imaging device 1 fails, only the failed light emitting device 2 or the failed first stereoscopic imaging device 1 needs to be replaced, thereby facilitating maintenance of the holographic projection device.

In addition, the light emitting device 2 may also be fixedly arranged at the bottom of the first stereoscopic imaging device 1. In this case, the light emitting device 2 is integrated with the first stereoscopic imaging device 1, the plurality of light emitting units 21 included in the light emitting device 2 have the one-to-one correspondence with the plurality of transparent pixel blocks 11 included in the first stereoscopic imaging device 1, and each transparent pixel block 11 can be illuminated by its corresponding light emitting unit 21. It is convenient for movement, and it does not need to adjust the position of the light emitting device 2 each time before the holographic projection device is used, thereby facilitating use of the holographic projection device.

Figure 1E:
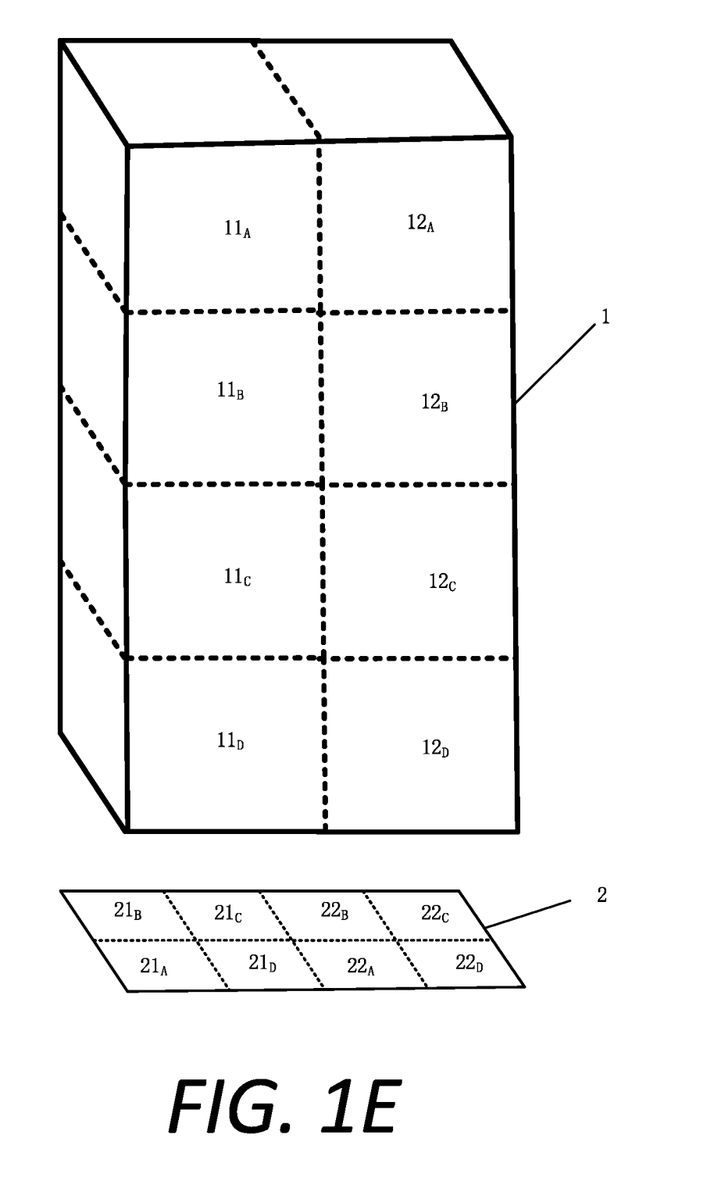
FIG. 1E is a schematic diagram illustrating a holographic projection device according to a fifth exemplary aspect of the present disclosure.

It should be noted that, in aspects of the present disclosure, in order to facilitate descriptions of the structure of the holographic projection device, in FIGS. 1A-1D, the various components (such as the plurality of transparent pixel blocks 11, the plurality of light emitting units 21, the plurality of transparent pixel layers 3, and the plurality of second stereoscopic imaging devices 4) included therein are separately illustrated. Certainly, in actual applications, the holographic projection device may be an integral body, i.e., the components included therein can be combined. As illustrated in FIG. 1E, the plurality of transparent pixel blocks 11 included in the first stereoscopic imaging device 1 can be arranged together, and the plurality of light emitting units 12 included in the light emitting device 2 can also be arranged together.

In aspects of the present disclosure, the holographic projection device includes the first stereoscopic imaging device and the light emitting device, the first stereoscopic imaging device includes a plurality of transparent pixel blocks, the light emitting device includes a plurality of light emitting units, and the plurality of transparent pixel blocks have the one-to-one correspondence with the plurality of light emitting units. Each light emitting unit is configured to illuminate its corresponding transparent pixel block, i.e., any 3D point in the first stereoscopic imaging device can be illuminated through the lighting emitting device, such that the holographic projection device can accurately achieve 3D projection of objects, and holographic projection effect is improved.

Figure 2:
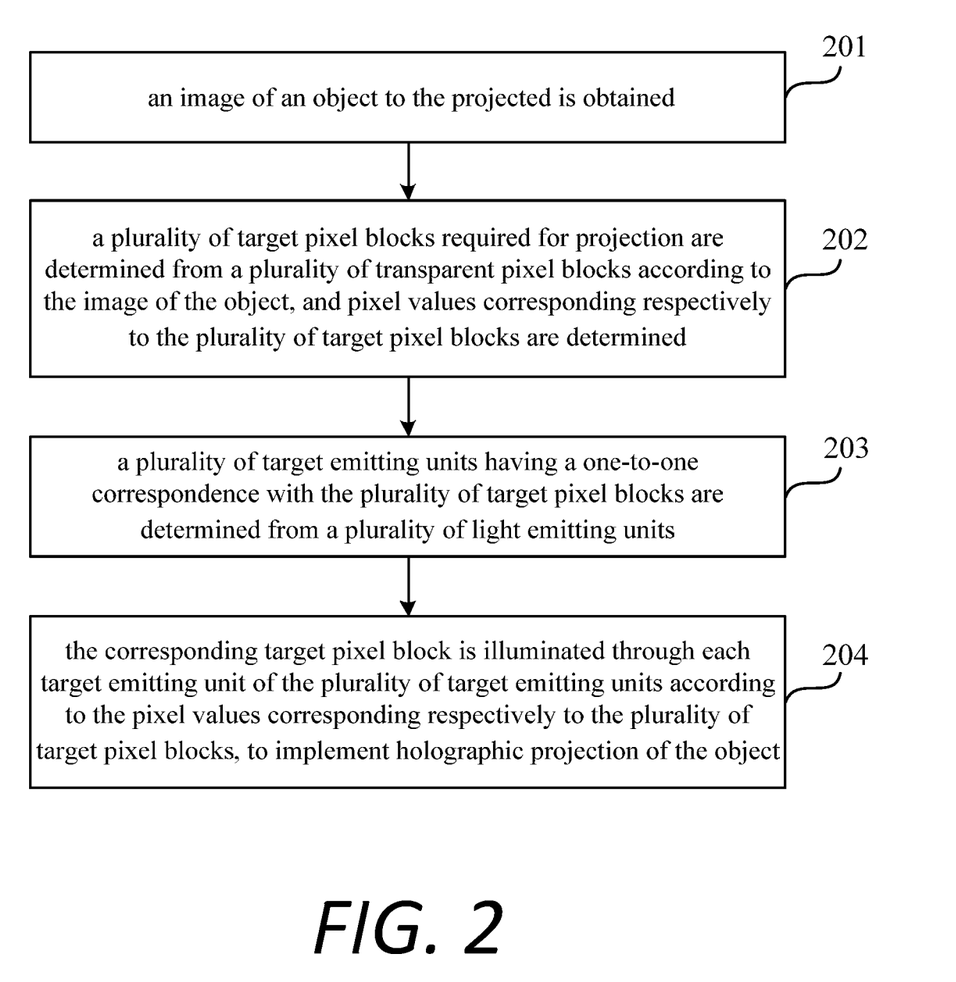
FIG. 2 is a flow chart of a holographic projection method according to an exemplary aspect of the present disclosure.

FIG. 2 is a flow chart of a holographic projection method according to an exemplary aspect, and the method is applicable to the holographic projection device illustrated in FIGS. 1A-1E. As illustrated in FIG. 2, the method may include followings.

At block 201, an image of an object to the projected is obtained.

It should be noted that, the 3d image of the object to the projected can be directly obtained, or a plurality of 2d images of the object to be projected can also be obtained.

At block 202, a plurality of target pixel blocks required for projection are determined from a plurality of transparent pixel blocks according to the image of the object, and pixel values corresponding respectively to the plurality of target pixel blocks are determined.

Block 202 may be implemented by acts of: determining a plurality of projection positions of the object according to the image of the object, and determining pixel values corresponding respectively to the plurality of projection positions; and determining transparent pixel blocks located at the plurality of projection positions in the plurality of transparent pixel blocks as the plurality of target pixel blocks, and determining the pixel values corresponding respectively to the plurality of projection positions as the pixel values corresponding respectively to the plurality of target pixel blocks.

Determining the plurality of projection positions of the object according to the image of the object and determining the pixel values corresponding respectively to the plurality of projection positions may be implemented by the following acts. When the image of the object includes a 3d image, for a pixel point A of a plurality of pixel points in the 3d image, a position where the pixel point A is located is determined as a projection position A, and a pixel value of the pixel point A is determined as a pixel value corresponding to the projection position A. The projection position A is any one of a plurality of projection positions of the object. When the image of the object includes a plurality of 2d images, the 3d image of the object can be constructed based on the plurality of 2d images, and then a position where a pixel point A in the 3d image is located is determined as a projection position A, and a pixel value of the pixel point A is determined as a pixel value corresponding to the projection position A.

At block 203, a plurality of target emitting units having a one-to-one correspondence with the plurality of target pixel blocks are determined from a plurality of light emitting units.

Block 203 may be implemented by acts of: selecting a target pixel block from the plurality of target pixel blocks, and processing the selected target pixel block until each target pixel block of the plurality of target pixel blocks is processed. The selected target pixel block is processed by acts of: obtaining a pixel block identifier of the selected target pixel block, obtaining a corresponding light emitting unit identifier from a correspondence between pixel block identifiers and light emitting unit identifiers according to the pixel block identifier of the selected target pixel block, and determining a light emitting unit identified by the corresponding light emitting unit identifier as the target emitting unit corresponding to the selected target pixel block.

It should be noted that, the pixel block identifier is configured to uniquely identify the transparent pixel block, and the light emitting unit identifier is configured to uniquely identify the light emitting unit.

For example, a pixel block identifier of a target pixel block is a pixel block identifier 1, according to the pixel block identifier 1, a corresponding light emitting unit identifier can be obtained as a light emitting unit identifier 1 from the correspondence between the pixel block identifiers and the light emitting unit identifiers shown in Table 1 below, and then the light emitting unit identified by the corresponding light emitting unit identifier 1 is determined as the target emitting unit corresponding to the target pixel block.

TABLE 1

| light emitting unit identifier | pixel block identifier |
| --- | --- |
| light emitting unit identifier 1 | pixel block identifier 1 |
| light emitting unit identifier 2 | pixel block identifier 2 |
| light emitting unit identifier 3 | pixel block identifier 3 |

It should be noted that, in aspects of the present disclosure, the correspondence between the pixel block identifiers and the light emitting unit identifiers shown in Table 1 above is merely an example, and is not intended to limit aspects of the present disclosure.

Furthermore, before the corresponding light emitting unit identifier is obtained from the correspondence between the pixel block identifiers and the light emitting unit identifiers according to the pixel block identifier of the selected target pixel block, the correspondence between the pixel block identifiers and the light emitting unit identifiers may be established first. When the correspondence between the pixel block identifiers and the light emitting unit identifiers is established, a pixel block identifier and a light emitting unit identifier carried in a setting instruction can be obtained when the setting instruction is detected, and the pixel block identifier and the light emitting unit identifier are stored in an association manner to form the correspondence between the pixel block identifiers and the light emitting unit identifiers.

It should be noted that, the setting instruction is configured to establish the correspondence between the pixel block identifiers and the light emitting unit identifiers carried therein, and the setting instruction can be triggered by the user. The user can trigger the setting instruction by a click operation, a slide operation, a voice operation, or the like.

At block 204, the corresponding target pixel block is illuminated through each target emitting unit of the plurality of target emitting units according to the pixel values corresponding respectively to the plurality of target pixel blocks, to implement holographic projection of the object.

Block 240 may be implemented by acts of: for a target emitting unit A of the plurality of target emitting units, illuminating a target pixel block A through the light having a pixel value X of the target block A emitted by the target emitting unit A.

It should be noted that, the light emitted by the plurality of light emitting units in the light emitting device may have different pixel values. Therefore, according to pixel values corresponding to the plurality of target pixel blocks, by emitting light having the pixel values corresponding to the plurality of target pixel blocks through the plurality of target emitting units, the plurality of target pixel blocks may have different colors after being illuminated, such that holographic projection of the object can be achieved more accurately.

In aspects of the present disclosure, the image of the object to be projected is obtained, and a plurality of target pixel blocks required for projection is determined from a plurality of transparent pixel blocks according to the image of the object to be projected, and pixel values corresponding respectively to the plurality of target pixel blocks are determined. Then, a plurality of target emitting units having a one-to-one correspondence with the plurality of target pixel blocks are determined from a plurality of light emitting units, and the corresponding target pixel block is illuminated through each target emitting unit of the plurality of target emitting units according to the pixel values corresponding respectively to the plurality of target pixel blocks, such that 3d projection of the object can be accurately achieved, and holographic projection effect of the object can be improved.

Figure 3A:
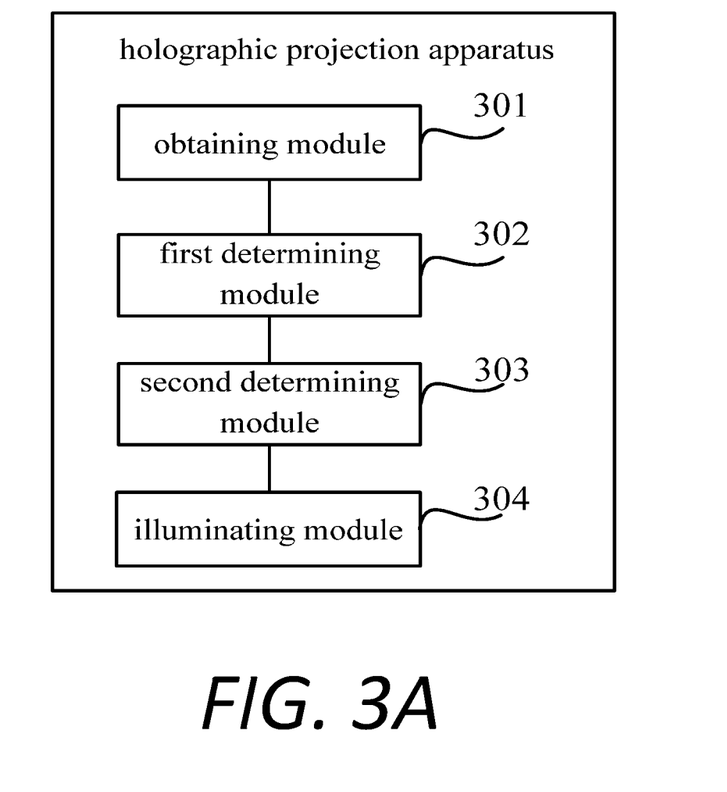
FIG. 3A is a block diagram of a holographic projection apparatus according to an exemplary aspect of the present disclosure.

FIG. 3A is a block diagram of a holographic projection apparatus according to an exemplary aspect, which is applicable to the holographic projection device illustrated in FIGS. 1A-1E. As illustrated in FIG. 3A, the device includes an obtaining module 301, a first determining module 302, a second determining module 303 and an illuminating module 304.

The obtaining module 301 is configured to obtain an image of an object to be projected.

The first determining module 302 is configured to determine a plurality of target pixel blocks required for projection from a plurality of transparent pixel blocks according to the image of the object, and determine pixel values corresponding respectively to the plurality of target pixel blocks.

The second determining module 303 is configured to determine a plurality of target emitting units having a one-to-one correspondence with the plurality of target pixel blocks from a plurality of light emitting units.

The illuminating module 304 is configured to illuminate the corresponding target pixel block through each target emitting unit of the plurality of target emitting units according to the pixel values corresponding respectively to the plurality of target pixel blocks, to implement holographic projection of the object.

Figure 3B:
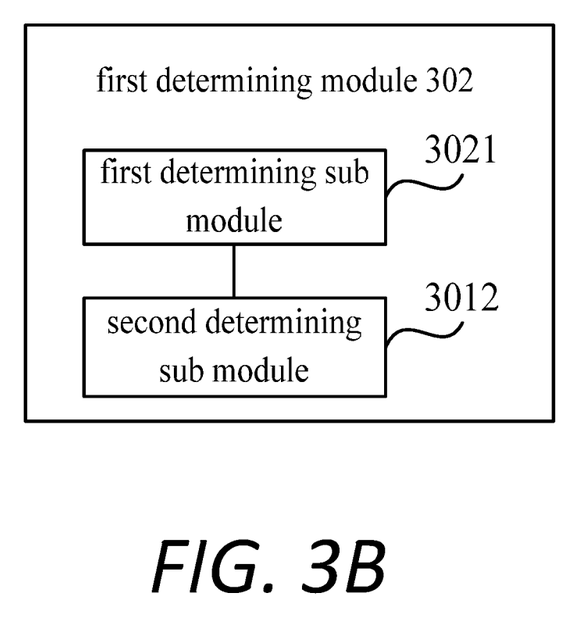
FIG. 3B is a block diagram of a first determining module according to an exemplary aspect of the present disclosure.

In at least one aspect, as illustrated in FIG. 3B, the first determining module 302 includes a first determining sub module 3021 and a second determining sub module 3022.

The first determining sub module 3021 is configured to determine a plurality of projection positions of the object according to the image of the object, and to determine pixel values corresponding respectively to the plurality of projection positions The second determining sub module 3022 is configured to determine transparent pixel blocks located at the plurality of projection positions in the plurality of transparent pixel blocks as the plurality of target pixel blocks, and to determine the pixel values corresponding respectively to the plurality of projection positions as the pixel values corresponding respectively to the plurality of target pixel blocks.

In aspects of the present disclosure, the image of the object to be projected is obtained, and a plurality of target pixel blocks required for projection is determined from a plurality of transparent pixel blocks according to the image of the object to be projected, and pixel values corresponding respectively to the plurality of target pixel blocks are determined. Then, a plurality of target emitting units having a one-to-one correspondence with the plurality of target pixel blocks are determined from a plurality of light emitting units, and the corresponding target pixel block is illuminated through each target emitting unit of the plurality of target emitting units according to the pixel values corresponding respectively to the plurality of target pixel blocks, such that 3d projection of the object can be accurately achieved, and holographic projection effect of the object can be improved.

Figure 4:
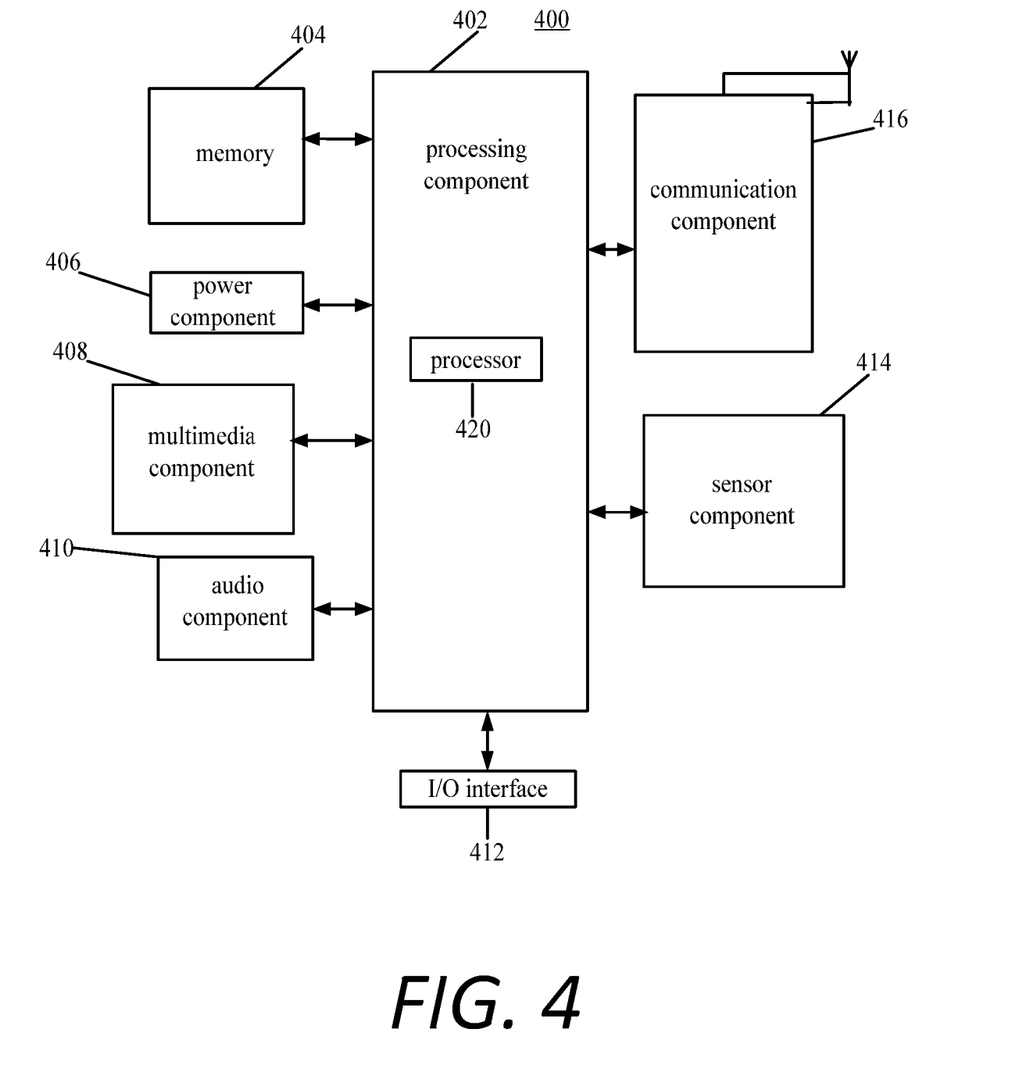
FIG. 4 is a block diagram of a holographic projection apparatus according to another exemplary aspect of the present disclosure.

FIG. 4 is a block diagram of a holographic projection apparatus according to another exemplary aspect. For example, the device 400 may be a mobile phone, a computer, a digital broadcasting terminal, a message transceiver device, a game console, a tablet device, a medical device, a fitness device and a personal digital assistant, etc.

Referring to FIG. 4, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the user equipment 400 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 408 includes a front-facing camera and/or a rear-facing camera. When the user equipment 400 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 410 is configured to output and/or input audio signals. For example, the audio component 410 includes a microphone ("MIC") configured to receive an external audio signal when the device 400 is in an operation mode, such as a call mode, a recording mode, and a voice recognition mode. The received audio signal may be further stored in the memory 404 or transmitted via the communication component 416. In some aspects, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some aspects, the sensor component 414 may also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as WiFi, 2G, or 3G, or a combination thereof. In one exemplary aspect, the communication component 416 receives a broadcast signal or broadcast associated information from an external broadcast management system via a broadcast channel. In one exemplary aspect, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer readable storage medium including instructions, such as the memory 404 including instructions. The instructions may be executed by the processor 420 in the device 400, to perform the above-described methods. For example, the non-transitory computer readable storage medium may be a ROM, a RAM, a CD-ROM, a magnetic tape, a floppy disc, an optical data storage device, and the like.

There is provided a non-transitory computer readable storage medium storing instructions thereon, when the instructions are executed by a processor in the mobile terminal, the mobile terminal can perform a holographic projection method, which is applicable to the holographic projection device illustrated in FIGS. 1A-1E. The method includes: obtaining an image of an object to be projected; determining a plurality of target pixel blocks required for projection from a plurality of transparent pixel blocks according to the image of the object, and determining pixel values corresponding respectively to the plurality of target pixel blocks; determining a plurality of target emitting units having a one-to-one correspondence with the plurality of target pixel blocks from a plurality of light emitting units; and illuminating the corresponding target pixel block through each target emitting unit of the plurality of target emitting units according to the pixel values corresponding respectively to the plurality of target pixel blocks, to implement holographic projection of the object.

In at least one aspect, determining the plurality of target pixel blocks required for projection from the plurality of transparent pixel blocks according to the image of the object and determining the pixel values corresponding respectively to the plurality of target pixel blocks includes: determining a plurality of projection positions of the object according to the image of the object, and determining pixel values corresponding respectively to the plurality of projection positions; and determining transparent pixel blocks located at the plurality of projection positions in the plurality of transparent pixel blocks as the plurality of target pixel blocks, and determining the pixel values corresponding respectively to the plurality of projection positions as the pixel values corresponding respectively to the plurality of target pixel blocks.

In aspects of the present disclosure, the image of the object to be projected is obtained, and a plurality of target pixel blocks required for projection is determined from a plurality of transparent pixel blocks according to the image of the object to be projected, and pixel values corresponding respectively to the plurality of target pixel blocks are determined. Then, a plurality of target emitting units having a one-to-one correspondence with the plurality of target pixel blocks are determined from a plurality of light emitting units, and the corresponding target pixel block is illuminated through each target emitting unit of the plurality of target emitting units according to the pixel values corresponding respectively to the plurality of target pixel blocks, such that 3d projection of the object can be accurately achieved, and holographic projection effect of the object can be improved.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A holographic projection device, comprising:
 a first stereoscopic imaging device including a plurality of transparent pixel blocks; and a light emitting device including a plurality of light emitting units,
   wherein the plurality of transparent pixel blocks have a one-to-one correspondence with the plurality of light emitting units, and
   wherein for a light emitting unit A of the plurality of light emitting units, the light emitting unit A is configured to illuminate a target area in a transparent pixel block A, in which the target area is made of a reflective material and reflects light from the light emitting unit A into people's eyes to be illuminated when there is light striking the target area, and the transparent pixel block A is a transparent pixel block corresponding to the light emitting unit A in the plurality of transparent pixel blocks.

2. The holographic projection device according to claim 1, wherein an area in the transparent pixel block A other than the target area is not reflective, and there is no target area in a transparent pixel block other than the transparent pixel block A between the target area in the transparent pixel block A and the light emitting unit A.

3. The holographic projection device according to claim 2, wherein light emitted by each light emitting unit of the plurality of light emitting units includes a laser.

4. The holographic projection device according to claim 1, wherein the first stereoscopic imaging device includes a plurality of transparent pixel layers, and
   wherein each transparent pixel layer of the plurality of transparent pixel layers is provided with at least one transparent pixel block of the plurality of transparent pixel blocks.

5. The holographic projection device according to claim 1, wherein the first stereoscopic imaging device includes a plurality of second stereoscopic imaging devices, and
   wherein the plurality of second stereoscopic imaging devices are arranged in a plurality of rows and columns, each second stereoscopic imaging device of the plurality of second stereoscopic imaging devices includes at least one transparent pixel block of the plurality of transparent pixel blocks, the at least one transparent pixel block being arranged vertically.

6. The holographic projection device according to claim 1, wherein the first stereoscopic imaging device has a columnar shape, and the light emitting device is arranged at a bottom of the first stereoscopic imaging device.

7. A holographic projection method, comprising:
   obtaining an image of an object to be projected;
   determining a plurality of target pixel blocks required for projection from a plurality of transparent pixel blocks based on the image of the object, and determining pixel values corresponding respectively to the plurality of target pixel blocks;
   determining a plurality of target emitting units having a one-to-one correspondence with the plurality of target pixel blocks from a plurality of light emitting units;
   illuminating a target area in the corresponding target pixel block through each target emitting unit of the plurality of target emitting units based on the pixel values corresponding respectively to the plurality of target pixel blocks, wherein each target area is made of a reflective material and reflects light from each target light emitting unit into people's eyes to be illuminated when there is light striking the target area; and
   generating a holographic projection of the object based on the illuminated corresponding target pixel block.

8. The holographic projection method according to claim 7, wherein determining the plurality of target pixel blocks required for projection from the plurality of transparent pixel blocks based on the image of the object and determining the pixel values corresponding respectively to the plurality of target pixel blocks includes:
   determining a plurality of projection positions of the object based on the image of the object, and determining pixel values corresponding respectively to the plurality of projection positions; and
   determining transparent pixel blocks located at the plurality of projection positions in the plurality of transparent pixel blocks as the plurality of target pixel blocks, and determining the pixel values corresponding respectively to the plurality of projection positions as the pixel values corresponding respectively to the plurality of target pixel blocks.

9. The holographic projection method according to claim 8, wherein determining the plurality of projection positions of the object based on the image of the object, and determining the pixel values corresponding respectively to the plurality of projection positions includes:
   when the image of the object includes a three-dimensional image, for a pixel point A of a plurality of pixel points in the three-dimensional image, determining a position where the pixel point A is located as a projection position A, and determining a pixel value of the pixel point A as a pixel value corresponding to the projection position A; and
   when the image of the object includes a plurality of two-dimensional images, constructing a three-dimensional image of the object based on the plurality of two-dimensional images, determining a position where a pixel point A in the three-dimensional image is located as a projection position A, and determining a pixel value of the pixel point A as a pixel value corresponding to the projection position A.

10. The holographic projection method according to claim 7, wherein determining the plurality of target emitting units having the one-to-one correspondence with the plurality of target pixel blocks from the plurality of light emitting units includes:
    selecting a target pixel block from the plurality of target pixel blocks;
    obtaining a pixel block identifier of the selected target pixel block, and obtaining a corresponding light emitting unit identifier from a correspondence between pixel block identifiers and light emitting unit identifiers based on the pixel block identifier of the selected target pixel block; and
    determining a light emitting unit identified by the corresponding light emitting unit identifier as the target emitting unit corresponding to the selected target pixel block.

11. The holographic projection method according to claim 10, further comprising:
    establishing the correspondence between the pixel block identifiers and the light emitting unit identifiers,
    wherein establishing the correspondence between the pixel block identifiers and the light emitting unit identifiers includes:
       detecting a setting instruction;
       obtaining a pixel block identifier and a light emitting unit identifier carried in the setting instruction; and
       storing the pixel block identifier and the light emitting unit identifier in an association manner to form the correspondence between the pixel block identifiers and the light emitting unit identifiers.

12. The holographic projection method according to claim 11, wherein the setting instruction is triggered by at least one of a click operation, a slide operation, and a voice operation.

13. The holographic projection method according to claim 7, wherein illuminating the corresponding target pixel block through each target emitting unit of the plurality of target emitting units based on the pixel values corresponding respectively to the plurality of target pixel blocks includes:

for a target emitting unit A of the plurality of target emitting units, illuminating a target pixel block A through light having a pixel value X of the target pixel block A emitted by the target emitting unit A.

14. A holographic projection apparatus, comprising:

a processor; and a memory configured to store instructions executable by the processor, wherein the processor is configured to:

obtain an image of an object to be projected;

determine a plurality of target pixel blocks required for projection from a plurality of transparent pixel blocks based on the image of the object, and determine pixel values corresponding respectively to the plurality of target pixel blocks;

determine a plurality of target emitting units having a one-to-one correspondence with the plurality of target pixel blocks from a plurality of light emitting units;

illuminate a target area in the corresponding target pixel block through each target emitting unit of the plurality of target emitting units based on the pixel values corresponding respectively to the plurality of target pixel blocks, wherein each target area is made of a reflective material and reflects light from each target light emitting unit into people's eyes to be illuminated when there is light striking the target area; and generate a holographic projection of the object based on the illuminated corresponding target pixel block.

15. The holographic projection apparatus according to claim 14, wherein, when determining the plurality of projection positions of the object based on the image of the object, and determining the pixel values corresponding respectively to the plurality of projection positions, the processor is further configured to:

determine a plurality of projection positions of the object based on the image of the object, and determine pixel values corresponding respectively to the plurality of projection positions; and determine transparent pixel blocks located at the plurality of projection positions in the plurality of transparent pixel blocks as the plurality of target pixel blocks, and determine the pixel values corresponding respectively to the plurality of projection positions as the pixel values corresponding respectively to the plurality of target pixel blocks.

16. The holographic projection apparatus according to claim 15, wherein when determining the plurality of projection positions of the object based on the image of the object, and determining the pixel values corresponding respectively to the plurality of projection positions, the processor is further configured to:

when the image of the object includes a three-dimensional image, for a pixel point A of a plurality of pixel points in the three-dimensional image, determine a position where the pixel point A is located as a projection position A, and determine a pixel value of the pixel point A as a pixel value corresponding to the projection position A;

when the image of the object includes a plurality of two-dimensional images, construct a three-dimensional image of the object based on the plurality of two-dimensional images, determine a position where a pixel point A in the three-dimensional image is located as a projection position A, and determine a pixel value of the pixel point A as a pixel value corresponding to the projection position A.

17. The holographic projection apparatus according to claim 14, wherein, when determining the plurality of target emitting units having the one-to-one correspondence with the plurality of target pixel blocks from the plurality of light emitting units, the processor is further configured to:

select a target pixel block from the plurality of target pixel blocks;

obtain a pixel block identifier of the selected target pixel block, and obtain a corresponding light emitting unit identifier from a correspondence between pixel block identifiers and light emitting unit identifiers based on the pixel block identifier of the selected target pixel block; and determine a light emitting unit identified by the corresponding light emitting unit identifier as the target emitting unit corresponding to the selected target pixel block.

18. The holographic projection apparatus according to claim 17, wherein the processor is further configured to:

establish the correspondence between the pixel block identifiers and the light emitting unit identifiers, wherein, when establishing the correspondence between the pixel block identifiers and the light emitting unit identifiers, the processor is further configured to:

detect a setting instruction;

obtain a pixel block identifier and a light emitting unit identifier carried in the setting instruction; and store the pixel block identifier and the light emitting unit identifier in an association manner to form the correspondence between the pixel block identifiers and the light emitting unit identifiers.

19. The holographic projection apparatus according to claim 18, wherein the setting instruction is triggered by at least one of a click operation, a slide operation, and a voice operation.

20. The holographic projection apparatus according to claim 14, wherein, when illuminating the corresponding target pixel block through each target emitting unit of the plurality of target emitting units based on the pixel values corresponding respectively to the plurality of target pixel blocks, the processor is further configured to:

for a target emitting unit A of the plurality of target emitting units, illuminate a target pixel block A through light having a pixel value X of the target pixel block A emitted by the target emitting unit A.

* * * * *